2,911,417

DYESTUFFS OF THE ANTHRAQUINONE SERIES

Ernst Anton and Julius Eisele, Ludwigshafen (Rhine), and Wilhelm Federkiel, Frankenthal, Pfalz, Germany, assignors to Badische Anilin- & Soda-Fabrik Aktiengesellschaft, Ludwigshafen am Rhine, Germany No Drawing. Application December 17, 1957
Serial No. 703,282

Claims priority, application Germany January 11, 1957

9 Claims. (Cl. 260—376)

This invention relates to new dyestuffs of the anthraquinone series, especially esters of aminoanthraquinone carboxylic acids with tertiary aminoalcohols, and to a process for the production of such new dyestuffs.

It is already known that the dyeing of fibers, fabrics, foils or masses made from the polymers of acrylonitrile offers considerable difficulties. In order to avoid these it has already been proposed to improve the dyeability of acrylonitrile polymers by pretreatment of the fibres with copper (I) salts. This dyeing method is not simple to carry out and moreover yields actually satisfactory results in only comparatively few cases.

We have now found that new dyestuffs which are especially well suited for dyeing structures of acrylonitrile polymers are obtained by esterifying an aminoanthraquinone carboxylic acid selected from the group consisting of 1-aminoanthraquinone-2-carboxylic acid, 1-amino-4-hydroxyanthraquinone-2-carboxylic acid, 1.4-diaminoanthraquinone-2-carboxylic acid, 5.8-diaminoanthraquinone-2-carboxylic acid and 5.8-diaminoanthraquinone-1-carboxylic acid, with a tertiary aminoalcohol of the general formula HO—A—B in which A means a lower saturated alkylene radical and B the radical of a secondary amine which is connected through the nitrogen atom to the lower saturated alkylene radical A.

The compounds thus obtainable are characterized by an affinity for fibres made from acrylonitrile polymers which in some cases is extremely high. On these fibres they yield, when dyed from aqueous dispersion, preferably in the acid region and at boiling temperature, if desired with an addition of dispersing agents and electrolytes, for example alkali sulfate, deep dyeings of excellent fastness properties. The new dyestuffs, of which the shade of color usually lies between red-yellow and blue-green, can advantageously also be used for dyeing structures of cellulose ethers or esters, poly-ethylene glycol terephthalate and polyamides. By reason of their good solubility, they can also be used for coloring hydrocarbons, lacquers and plastic compositions.

As initial materials there are suitable for example: anthraquinone monocarboxylic acids, anthraquinone-alpha-carboxylic acids, anthraquinone-beta-carboxylic acids, anthraquinone carboxylic acids which contain substituents in alpha-position, anthraquinone carboxylic acids which contain substituents in beta-position, aminoanthraquinone carboxylic acids, alkylaminoanthraquinone carboxylic acids, aralkylaminoanthraquinone carboxylic acids, arylaminoanthraquinone carboxylic acids, monoaminoanthraquinone carboxylic acids, diaminoanthraquinone carboxylic acids, aminonitroanthraquinone carboxylic acids, aminohalogenanthraquinone carboxylic acids, aminohydroxyanthraquinone carboxylic acids, monohalogenanthraquinone carboxylic acids, dihalogenanthraquinone carboxylic acids, chloranthraquinone carboxylic acids and bromanthraquinone carboxylic acids. There may be mentioned individually: 1-aminoanthraquinone-2-carboxylic acid, 1-methylaminoanthraquinone-2-carboxylic acid, 1-chloranthraquinone-2-carboxylic acid, 1-amino-4-nitroanthraquinone-2-carboxylic acid, 1-methylamino-4-nitroanthraquinone-2-carboxylic acid, 1-amino-4-bromanthraquinone-2-carboxylic acid, 1.4-dibromanthraquinone-2-carboxylic acid, 5.8-dichloranthraquinone-1-carboxylic acid, 5.8-dichloranthraquinone-2-carboxylic acid, 1-amino-4-hydroxyanthraquinone-2-carboxylic acid and 1-methylamino-4-hydroxyanthraquinone-2-carboxylic acid.

As tertiary aminoalcohols of the general formula HO—A—B in which A means a lower saturated alkylene radical and B the radical of a secondary amine which is connected through the nitrogen atom to the lower saturated alkylene radical A there may be mentioned for example compounds in which A is an ethylene, propylene or butylene radical and B the radical of an aliphatic secondary amine, an aromatic secondary amine or a cyclic secondary amine, such as 1-dimethylamino-3-hydroxypropane, 1-dimethylamino-4-hydroxybutane, or the tertiary aminoalcohols readily accessible for example by adding on ethylene oxide to secondary amines, such as N.N - dimethylethanolamine, N.N-diethylethanolamine, N.N-dipropylethanolamine, N.N-dibutylethanolamine, N-methyl - N-phenylethanolamine, beta-morpholinoethanol and pyrrolidino- or piperidinoethanol.

Of particular importance are radicals of saturated aliphatic amines, which contain preferably in each of the aliphatic radicals from 1 to 5 carbon atoms.

The esterification can be effected by heating the carboxylic acid and the tertiary aminoalcohol in the presence of sulfuric acid or by reaction of the carboxylic acid halide and the tertiary aminoalcohol, if desired with the use of a diluent, such as benzene or chlorbenzene. The same compounds can also be arrived at by first converting the anthraquinone carboxylic acid halide by means of the corresponding chlorhydrin into the chloralkyl ester and then exchanging the halogen therein by the radical of a secondary amine.

If the ester thus prepared contains in the 4-position of the anthraquinone nucleus a nitro group, this is reduced to the amino group in the usual way. If a halogen atom is present in the alpha-position of the anthraquinone nucleus, this is reacted with an arylamine or a sulfonamide. Such acylamino groups present in alpha-position, for example toluenesulfamino groups, can be converted by hydrolysis into amino groups.

The dyeing of the structures of acrylonitrile polymers can be effected by treating them in an aqueous dyebath which contains the dyestuff in finely divided form, in the presence of mineral acid or acetic acid at the boiling temperature. Agents having dispersing or wetting action and also other usual auxiliaries can be added to the dyebath.

The following examples will further illustrate this invention but the invention is not restricted to these examples. The parts specified in the examples are parts by weight.

Example 1

A mixture of 99 parts of 1-amino-4-nitroanthraquinone-2-carboxylic acid chloride and 150 parts of N.N-dimethylethanolamine is heated for an hour at 100° C. Upon cooling there separate from the liquid red crystals; these are filtered off by suction, washed with methanol and dried.

19.1 parts of the ester thus obtained are suspended in 100 parts of alcohol. Then while stirring well there is added a solution of 37.5 parts of tin-II-chloride in 38 parts of concentrated hydrochloric acid. The temperature thereby rises to about 70° C. After the reaction the whole is heated to boiling under reflux for 15 minutes. The deposited red crystals are filtered off by suction after cooling, washed with a mixture of alcohol and an about 35 percent aqueous hydrochloric acid solution (10:4) and then suspended in 1,000 parts of water. While stirring vigorously at 80° to 90° C., air is led in until the color of the mixture has become pure blue. After cooling, the whole is made soda-alkaline and then the dyestuff is filtered off, washed and dried at 100° C. It can be further purified by crystallization from dioxane. It has the following constitution:

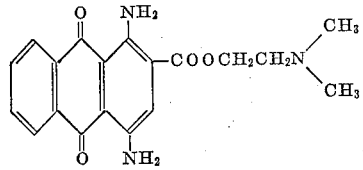

and dyes structures of polyacrylonitrile powerful blue shades of excellent fastness from acid aqueous suspensions at the boiling temperature. It dissolves in sulfuric acid with a pale yellow color. Upon the addition of paraformaldehyde the color changes to blue.

*Example 2*

13.6 parts of 1.4-dichloranthraquinone-2-carboxylic acid chloride are heated with 14.4 parts of N.N-dimethylethanolamine while stirring at 100° C. until esterification has taken place. After dilution with 30 parts of alcohol, it is allowed to cool. The ester which separates in crystalline form is filtered off by suction, washed with alcohol and dried.

13.5 parts of the 1.4-dichloranthraquinone-2-carboxylic acid-beta-dimethylaminoethyl ester thus prepared, 18 parts of para-toluenesulfonamide, 17.5 parts of potassium acetate, 0.7 part of copper acetate and 50 parts of nitrobenzene are heated to 170° C. until halogen ester is no longer detectable. After stirring in 100 parts of alcohol, the whole is allowed to cool and the dyestuff is filtered off by suction, washed with alcohol and water and dried.

The 1.4-ditoluenesulfaminoanthraquinone-2-carboxylic acid-beta-dimethylaminoethyl ester can be saponified by stirring for an hour at 20° to 25° C. with ten times the amount of concentrated sulfuric acid. A blue powder is obtained which is entirely equal to the dyestuff obtained according to Example 1 in its properties.

*Example 3*

132 parts of 1-amino-4-nitroanthraquinone-2-carboxylic acid chloride are heated with 240 parts of N.N-diethyl-ethanolamine while stirring at 90° C. When reaction sets in, the whole is cooled to such an extent that the temperature does not rise above 100° C. It is then kept at this temperature for an hour. After cooling, it is filtered by suction, washed wih methanol and water and dried. The ester can be purified by recrystallization from alcohol.

The reduction of the ester can be carried out in the way specified in Example 1. The 1.4-diamonianthraquinone-2-carboxylic acid-beta-diethylaminoethyl ester thus obtained yields blue dyeings with very good fastness properties on structures of polyacrylonitrile.

*Example 4*

A mixture of 66 parts of 1-amino-4-nitroanthraquinone-2-carboxylic acid chloride and 135 parts of N.N-dibutyl-ethanolamine is heated at 65° C. The temperature is prevented from rising above 70° C. by gentle cooling. After the reaction is over, it is still kept for an hour at 70° C. The red ester which separates on cooling is filtered off by suction, washed with methanol and dried.

23.4 parts of 1-amino-4-nitroanthraquinone-2-carboxylic acid-beta-dibutylaminoethyl ester is suspended in 100 parts of alcohol and then there is added a solution of 47 parts of tin-II-chloride hydrate in 47 parts of concentrated hydrochloric acid. After the reaction has died out, the whole is worked up as described in Example 1. The 1.4-diaminoanthraquinone-2-carboxylic acid-beta-di- butylaminoethyl ester obtained is a blue powder which dyes polyacrylonitrile powerful blue shades of very good fastness properties.

*Example 5*

85 parts of 1-aminoanthraquinone-2-carboxylic acid chloride are heated with 100 parts of N.N-dimethylethanolamine for an hour at 100° C. while stirring. 200 parts of alcohol are stirred into the hot red solution. The deposited red crystals are filtered off after cooling, washed with alcohol and water and dried. They dissolve in concentrated sulfuric acid with a pale yellow color. Upon the addition of paraformaldehyde, the color changes to blue. The 1-amino-anthraquinone-2-carboxylic acid-beta-dimethylaminoethyl ester thus obtained dyes polyacrylonitrile orange shades.

*Example 6*

34 parts of 5.8-dichloranthraquinone-1-carboxylic acid chloride and 30 parts of N,N-dimethylethanolamine are heated at 100° C. until the initially liquid mixture becomes a crystalline solid. It is triturated with alcohol, filtered by suction, washed with alcohol and water and dried.

39 parts of the 5.8-dichloranthraquinone-1-carboxylic acid dimethylaminoethyl ester thus obtained, 51 parts of para-toluene-sulfamide, 50 parts of potassium acetate, 2 parts of copper acetate and 300 parts of butanol are heated to boiling under reflux for 20 hours. Upon the addition of 250 parts of methanol, the liquid deposits brown-red needles. These are filtered off by suction after a few hours, washed with methanol and then with water and finally dried. The saponification of the ditoluenesulfamino compound takes place by stirring for a short time with ten times the amount of concentrated sulfuric acid. The red-yellow sulfuric acid solution is poured onto ice and the deposited sulfate is washed with water and triturated with potassium acetate solution. The dyestuff is then filtered off by suction, washed with icewater and dried in the air. It has the constitution

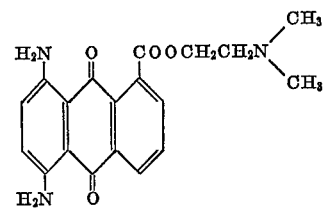

and dyes polyacrylonitrile violet shades of good fastness properties from an acid aqueous bath.

5.8-dichloranthraquinone-1-carboxylic acid can be obtained by chlorination of anthraquinone-1-carboxylic acid in sulfuric acid monohydrate at 120° C. in the presence of iodine.

If the 5.8-dichloranthraquinone-1-carboxylic acid be replaced by 5.8-dichloranthraquinone-2-carboxylic acid, a dyestuff with similar shade of color is obtained.

*Example 7*

50 parts of 1-amino-4-nitroanthraquinone-2-carboxylic acid chloride are slowly heated to 80° C. in admixture with 95 parts of beta-piperidino-ethanol. After the reaction has subsided, the temperature is raised for an hour to 100° C., the whole then allowed to cool, the deposited red crystals filtered off by suction, washed with methanol and dried.

For reduction, 31.8 parts of the compound thus obtained are suspended in 150 parts of alcohol and reacted while stirring well with a solution of 57 parts of tin-II-chloride in 57 parts of concentrated hydrochloric acid, the temperature thus rising to about 75° C. The blue reaction mixture, after cooling, is worked up as described in Example 1.

The dyestuff obtained has the formula:

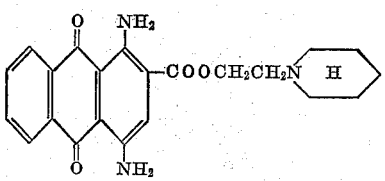

and dyes structures of polyacrylonitrile brilliant blue shades from an aqueous acid medium.

*Example 8*

A mixture of 110 parts of 1-amino-4-nitroanthraquinone-2-carboxylic acid chloride, 100 parts of nitrobenzene and 100 parts of beta-morpholino-ethanol is heated for several hours at 100° C. From the red solution there separates on cooling crystallized 1-amino-4-nitroanthraquinone-2-carboxylic acid-beta-morpholino-ethyl ester which is filtered off by suction, washed with alcohol and dried.

21.2 parts of this compound are suspended in 100 parts of ethanol and reduced, as described in Example 1, with a solution of 37.5 parts of tin-II-chloride in 43 parts of concentrated hydrochloric acid. The dyestuff obtained can be purified by crystallization from aqueous dimethylformamide. It has the formula:

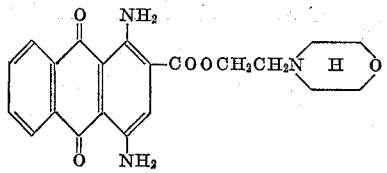

and dyes structures of polyacrylonitrile blue shades.

*Example 9*

A mixture of 15 parts of 1-dimethylamino-3-hydroxypropane (obtainable from 1-dimethylamino-3-aminopropane by reaction with sodium nitrite and hydrochloric acid), 15 parts of 1-amino-4-nitroanthraquinone-2-carboxylic acid chloride and 10 parts of nitrobenzene is heated to 100° C. for 1 hour. 60 parts of methanol are stirred into the red solution, the basic ester thereby separating in the form of red crystals. They are filtered off by suction, washed with methanol, and dried.

7.8 parts of this compound are suspended in fine dispersion in 200 parts of water and reduced with 16.4 parts of sodium dithionite, the temperature thereby rising somewhat. The reaction mixture is kept for an hour at 30° C. and then air is led through the green-yellow liquid for several hours. The dyestuff thereby deposited in the form of blue needles is filtered off by suction, washed with water and dried. It has the formula:

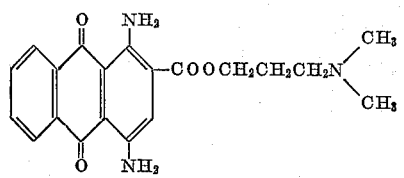

and dyes polyacrylonitrile fibres clear blue shades.

*Example 10*

5 parts of 1-amino-4-hydroxyanthraquinone-2-carboxylic acid are dissolved in 75 parts of concentrated sulfuric acid and then while cooling 8 parts of dimethylamino-ethanol are allowed to flow into the solution and the whole heated for 30 hours at 130° to 140° C. After cooling, a small precipitate which still remains is filtered off by suction; the filtrate is poured into ice-water, a blue-red precipitate thereby forming which is filtered off by suction and washed. Dilute sodium carbonate solution is then added and the product again filtered off by suction, washed and dried. The violet powder obtained can be purified by recrystallization from dioxane. The dyestuff has the formula:

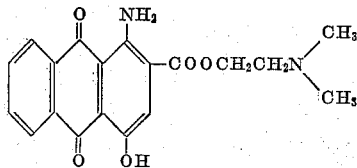

and gives, on structures of polyacrylonitrile, dyeings in violet shades and of good fastness properties. It dissolves in concentrated sulfuric acid with a yellow color which changes to blue upon the addition of paraformaldehyde.

What we claim is:

1. A dyestuff of the general formula Z—COO—A—B in which Z—COO represents a radical selected from the group consisting of 1-aminoanthraquinone-2-carboxy, 1-amino-4-hydroxyanthraquinone-2-carboxy, 1.4-diaminoanthraquinone-2-carboxy, 5.8-diaminoanthraquinone-2-carboxy and 5.8-diaminoanthraquinone-1-carboxy, A represents a lower saturated alkylene radical and B represents a radical of a secondary amine selected from the group consisting of a secondary lower alkylamine, morpholine and piperidine, said secondary amine being connected through its nitrogen atom to the lower saturated alkylene radical A.

2. A dyestuff according to claim 1 of the general formula

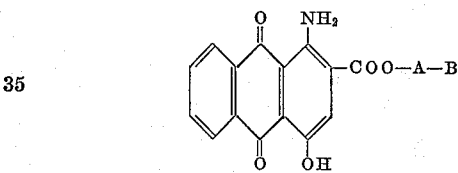

in which A and B have the significance specified in claim 1.

3. A dyestuff according to claim 1 of the general formula

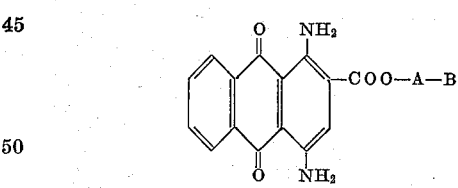

in which A and B have the significance specified in claim 1.

4. The dyestuff according to claim 3 having the formula

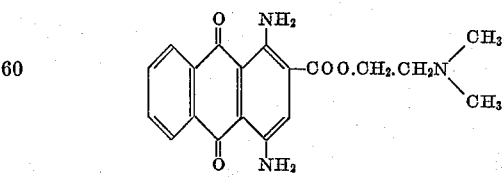

5. The dyestuff according to claim 3 having the formula

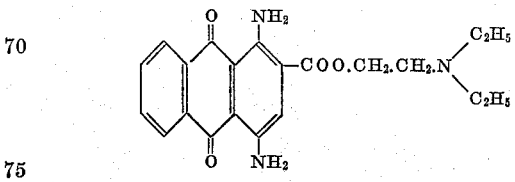

6. The dyestuff according to claim 3 having the formula

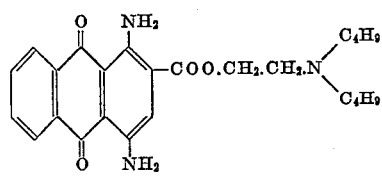

7. A dyestuff according to claim 1 having the general formula

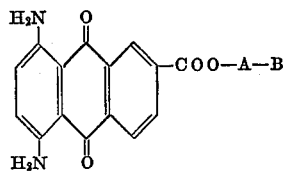

in which A and B have the significance specified in claim 1.

8. A dyestuff according to claim 1 of the general formula

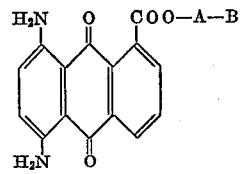

in which A and B have the significance specified in claim 1.

9. The dyestuff according to claim 8 having the formula

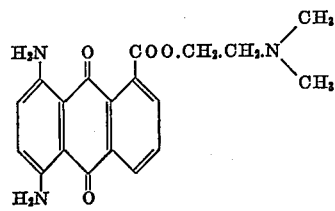

References Cited in the file of this patent
UNITED STATES PATENTS
1,833,272   Wilke _____ Nov. 24, 1951
FOREIGN PATENTS
721,283   Great Britain _____ Jan. 5, 1955

UNITED STATES PATENT OFFICE
CERTIFICATE OF CORRECTION

Patent No. 2,911,417                                             November 3, 1959

Ernst Anton et al.

It is hereby certified that error appears in the printed specification of the above numbered patent requiring correction and that the said Letters Patent should read as corrected below.

Column 3, line 56, for "1.4-diamonianthraqui-" read -- 1.4-diaminoanthraqui- --.

Signed and sealed this 7th day of June 1960.

(SEAL)
Attest:

KARL H. AXLINE                                          ROBERT C. WATSON
Attesting Officer                                     Commissioner of Patents